(12) United States Patent
Takemura et al.

(10) Patent No.: US 8,972,208 B2
(45) Date of Patent: Mar. 3, 2015

(54) FLOW METER DEVICE

(75) Inventors: Kouichi Takemura, Nara (JP); Fumikazu Shiba, Nara (JP); Yuji Nakabayashi, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 13/993,406

(22) PCT Filed: Dec. 6, 2011

(86) PCT No.: PCT/JP2011/006811
§ 371 (c)(1),
(2), (4) Date: Jun. 12, 2013

(87) PCT Pub. No.: WO2012/081195
PCT Pub. Date: Jun. 21, 2012

(65) Prior Publication Data
US 2013/0269447 A1    Oct. 17, 2013

(30) Foreign Application Priority Data
Dec. 13, 2010 (JP) ................................. 2010-276592

(51) Int. Cl.
*G01F 1/66* (2006.01)
*G01F 1/00* (2006.01)
*G01B 17/00* (2006.01)

(52) U.S. Cl.
CPC ........................................ *G01F 1/66* (2013.01)
USPC ............................ 702/48; 702/45; 73/861.27

(58) Field of Classification Search
USPC ............................... 702/48, 45, 46; 73/861.27
See application file for complete search history.

(56) References Cited

U.S. PATENT DOCUMENTS 5,108,182 A * 4/1992 Murphy ........................ 356/473
2002/0062690 A1 * 5/2002 Kobayashi et al. ......... 73/204.27
(Continued)

FOREIGN PATENT DOCUMENTS

| JP | 2002-162269 A | 6/2002 |
| JP | 3689973 B2 | 8/2005 |
| JP | 2008-014800 A | 1/2008 |

(Continued)

OTHER PUBLICATIONS

International Search Report for International Application No. PCT/JP2011/006811, dated Feb. 21, 2012, 3 pages.

*Primary Examiner* — Michael Nghiem
*Assistant Examiner* — Alexander Satanovsky
(74) *Attorney, Agent, or Firm* — Brinks Gilson & Lione

(57) ABSTRACT

In a flow meter device of the present invention, a time measuring section of the flow meter device includes a first counter which starts counting at a starting point of measurement of propagation time; and a second counter which starts counting at an end point of the measurement of the propagation time, and performs counting at a higher speed than the first counter. A propagation time T0 is finally obtained by subtracting time Δt which is measured by the second counter and passes from the end point until the first counter counts up, from time T which is measured by the first counter and passes from a starting point until the first counter counts up after the end point. A flow calculating section calculates a flow with high accuracy using the propagation time T0. Thus, lower electric power consumption can be achieved, and accuracy of measurement of flow can be improved.

3 Claims, 3 Drawing Sheets

(56) References Cited

U.S. PATENT DOCUMENTS

2004/0267464 A1* 12/2004 Umekage et al. ............... 702/48
2008/0289434 A1* 11/2008 Takemura et al. ......... 73/861.27

FOREIGN PATENT DOCUMENTS

| JP | 2009-094811 | * 10/2010 | ................ G01F 1/66 |
| JP | 2010-243432 A | 10/2010 | |

* cited by examiner

FLOW METER DEVICE

This application is a 371 application of PCT/JP2011/006811 having an international filing date of Dec. 6, 2011, which claims priority to JP2010-276592 filed Dec. 13, 2010, the entire contents of which are incorporated herein by reference.

TECHNICAL FIELD

The present invention relates to a flow meter device for measuring a flow (flow rate) of a fluid such as a gas, by utilizing an ultrasonic wave.

BACKGROUND ART

Various flow meter devices for measuring a flow of a fluid such as a gas by utilizing an ultrasonic wave have been proposed and put into practice. This flow meter device is typically configured in such a manner that a measurement passage is provided with a pair of ultrasonic transmitters/receivers, and ultrasonic pulses are transmitted and received alternately. This makes it possible to measure a flow velocity of a fluid based on a difference between a propagation time in a forward direction and a propagation time in a reverse direction. Therefore, the flow of the fluid can be measured by utilizing the flow velocity and a pipe diameter of the measurement passage.

Such a flow meter device is conventionally aimed at obtaining a highly accurate flow value while achieving low electric power consumption. For example, Patent Literature 1 discloses a flow meter device including a number setting means which changes the number of times alternate transmission/reception between an ultrasonic transmitter and an ultrasonic receiver is repeated, a first time measuring means which counts a signal of a low-frequency oscillator when the repeated transmission/reception starts, a second time measuring means which starts to count a signal from a RF oscillator after a passage of the time set by the first time measuring means and stops counting when the repeated transmission/reception ends, and a flow calculating means which calculates total times using the first time measuring means and the second time measuring means, and derives a flow (flow rate) based on a difference between the total times, and the time set by the first time measuring means is changed based on the value of the number setting means.

In accordance with the above stated configuration, the first time measuring means which is low in frequency, is used for most of a time required for the measurement, while the second time measuring means which is high in frequency is activated only when high accuracy is needed. Therefore, it becomes possible to attain a high resolution in low electric power consumption.
Patent Literature 1: Japanese Patent No. 3689973

SUMMARY OF THE INVENTION

Technical Problem

In recent years, a flow meter device has been developed to provide multiple functions, for example, a communication network is utilized in meter-reading of a flow measured by the flow meter device, a gas meter as an example of the flow meter device is interactively connected to a gas leakage alarm device, or the like, etc. However, the flow meter device includes a built-in battery as an electric power supply and is used for many years substantially without going through any maintenance. Therefore, with a progress of the multiple functions, a demand for implementing flow measurement with lower electric power consumption and higher accuracy than the conventional flow meter devices has been increasing.

The present invention has been made to solve the above described problem, and an object is to provide a flow meter device which can achieve lower electric power consumption and higher accuracy of flow measurement.

Solution to Problem

To solve the above described problem, a flow meter device of the present invention comprises a pair of ultrasonic transmitters/receivers which are placed at an upstream side and a downstream side, respectively, in a measurement passage; a transmission/reception switching section for performing switching of transmission/reception of the ultrasonic transmitters/receivers; a transmission section for actuating the ultrasonic transmitter/receiver at a transmission side to transmit an ultrasonic wave; a reception section for detecting the ultrasonic wave received in the ultrasonic transmitter/receiver at a reception side; a time measuring section for measuring a propagation time of the ultrasonic wave transmitted and received between the pair of ultrasonic transmitters/receivers; and a flow calculating section for calculating a flow value of the fluid based on the propagation time; wherein the time measuring section includes: a first counter which starts counting at a starting point of measurement of the propagation time; and a second counter which starts counting at an end point of the measurement of the propagation time, and performs counting at a higher speed than the first counter; and wherein the time measuring section is configured to measure the propagation time by subtracting time which is measured by the second counter and passes from the end point until the first counter counts up, from time which is measured by the first counter and passes from the starting point until the first counter counts up after the end point.

In the above configuration, the second counter may stop counting just after the first counter counts up after the end point.

In the above configuration, when the end point is a zero cross point of a reception waveform in the ultrasonic transmitter/receiver at the reception side; the time measuring section may measure times which pass until a plurality of zero cross points to obtain a plurality of propagation times; and the flow calculating section may calculate the flow using an average propagation time which is derived by averaging the plurality of propagation times obtained in the time measuring section.

In the above configuration, the time measuring section may obtain the plurality of propagation times under a condition in which zero cross points where a sign changes from positive to negative are set equal in number to zero cross points where the sign changes from negative to positive, when the plurality of zero cross points are used.

In the above configuration, a frequency of a count of the first counter may be set to a frequency which is equal to or greater than twice as high as a frequency of the ultrasonic wave transmitted from the ultrasonic transmitter/receiver.

The above and further objects, features and advantages of the present invention will more fully be apparent from the following detailed description of preferred embodiments with accompanying drawings.

Advantageous Effects of the Invention

As described above, the present invention has an advantage that it is possible to provide a flow meter device which can achieve lower electric power consumption and higher accuracy of flow measurement.

DETAILED DESCRIPTION OF THE PREFERRED EMBODIMENTS

Figure 1:
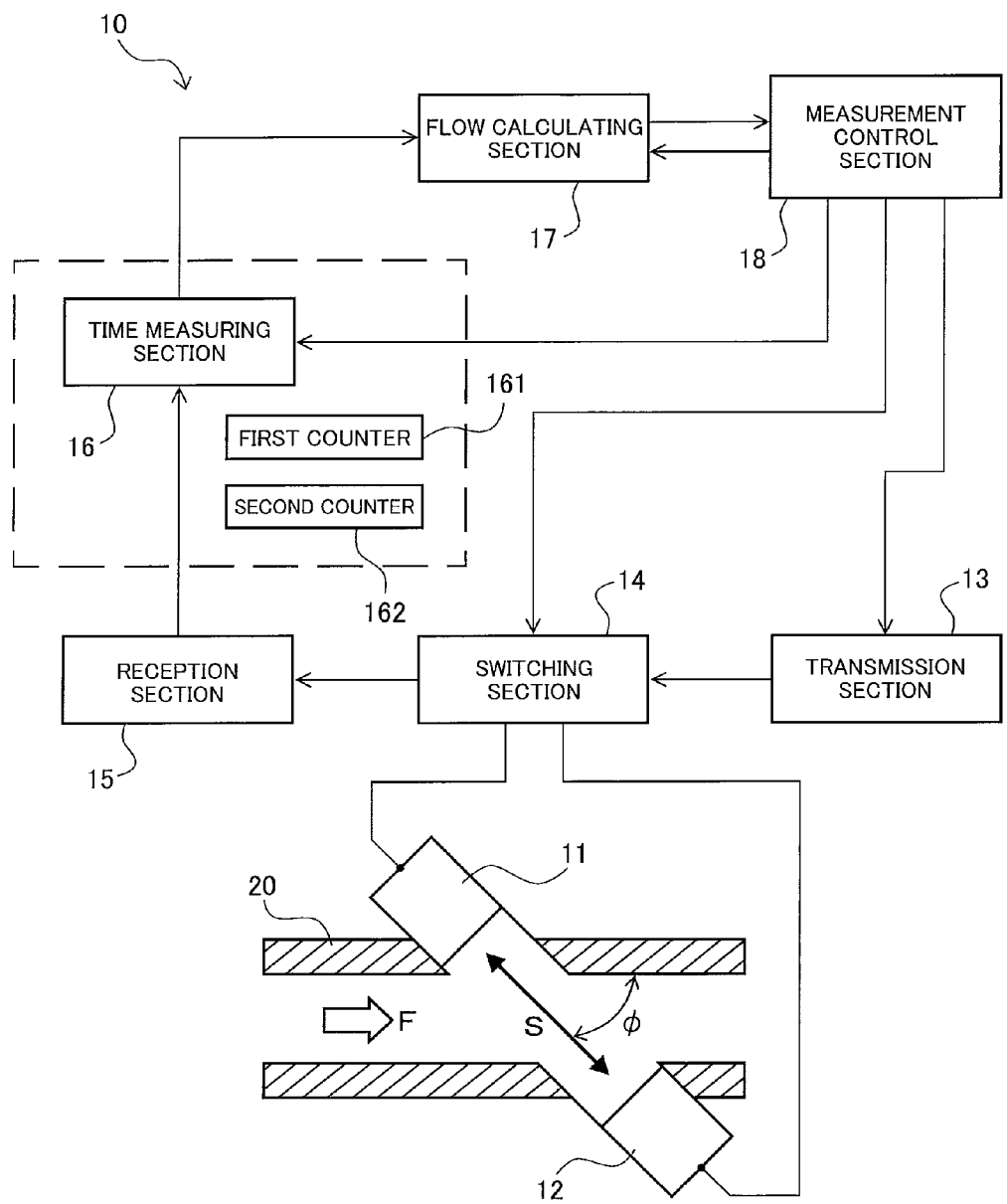
FIG. 1 is a block diagram showing a typical example of a configuration of a flow meter device according to an embodiment of the present invention.

Hereinafter, a preferred embodiment of the present invention will be described with reference to the drawings. Throughout the drawings, the same or corresponding components are identified by the same reference numerals, and will not be described in repetition.

[Configuration of Flow Meter Device]

A configuration of a flow meter device according to an embodiment of the present invention will be described with reference to FIG. 1. As shown in FIG. 1, a flow meter device 10 of the present embodiment includes a pair of ultrasonic transmitters/receivers 11 and 12, a transmission section 13, a switching section 14, a reception section 15, a time measuring section 16, a flow calculating section 17 and a measurement control section 18. The pair of ultrasonic transmitters/receivers 11 and 12 are placed to face each other in a direction crossing a measurement passage 20 in which a gas which is a measurement target flows in a direction of an arrow F in FIG. 1. As shown in FIG. 1, in the present embodiment, the first ultrasonic transmitter/receiver 11 and the second ultrasonic transmitter/receiver 12 are placed to face each other and cross the measurement passage 20 in a direction which is inclined with respect to the measurement passage 20. When the direction in which the gas flows in the measurement passage 20 is the arrow F in FIG. 1, the first ultrasonic transmitter/receiver 11 and the second ultrasonic transmitter/receiver 12 face each other in the inclined direction with an angle φ.

The first ultrasonic transmitter/receiver 11 and the second ultrasonic transmitter/receiver 12 are configured to transmit and receive the ultrasonic wave as indicated by an arrow S in FIG. 1. The switching section 14 performs switching of transmission/reception of the pair of ultrasonic transmitters/receivers 11 and 12 in specified cycles under control executed by the measurement control section 18. The transmission section 13 actuates one of the ultrasonic transmitters/receivers 11 and 12 set as a transmission side to transmit the ultrasonic wave to the other. The reception section 15 detects the ultrasonic wave received in one of the ultrasonic transmitters/receivers 11 and 12 set as a reception side.

The time measuring section 16 measures a propagation time of the ultrasonic wave detected in the reception section 15. In the present embodiment, the time measuring section 16 includes a first counter 161 for starting counting at a starting point of the measurement of the propagation time, and a second counter 162 which starts counting at an end point of the measurement of the propagation time, and performs counting at a higher speed than the first counter 161. The flow calculating section 17 calculates a gas flow value from the propagation time detected by the time measuring section 16. The measurement control section 18 controls a flow measurement operation.

Specific configurations of the transmission section 13, the switching section 14, the reception section 15, the time measuring section 16, the first counter 161, the second counter 162, the flow calculating section 17, and the measurement control section 18 are not particularly limited, and circuits, elements, processors, etc., which are known in fields of the flow meter device using the ultrasonic wave, may be suitably used.

[Operation of Flow Meter Device]

Figure 2:
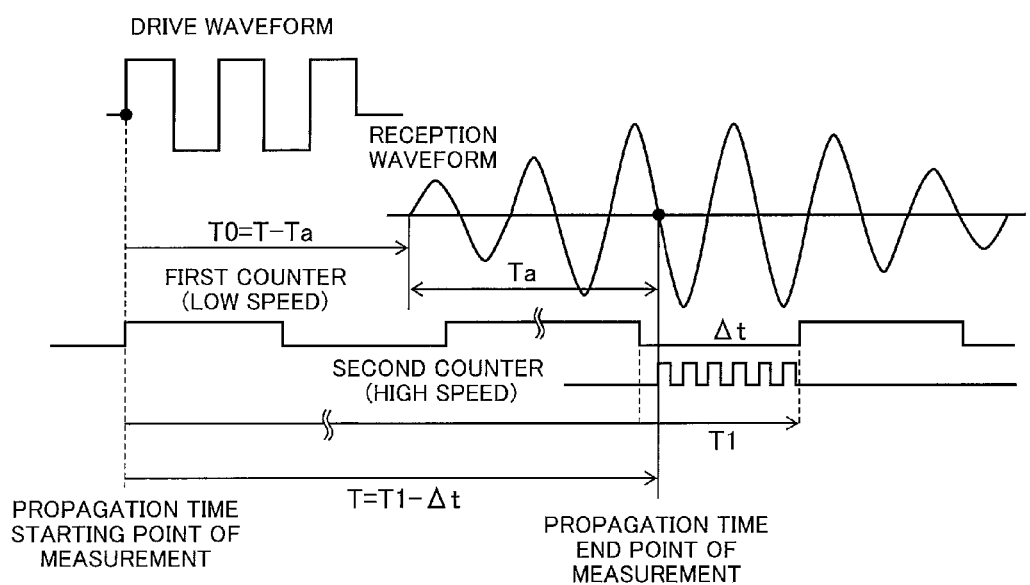
FIG. 2 is a time chart showing an example of propagation time measurement of an ultrasonic wave which is based on a relationship among a transmission waveform of the ultrasonic wave, a reception waveform of the ultrasonic wave, and counting operations of counters in the flow meter device of FIG. 1.
Figure 3:
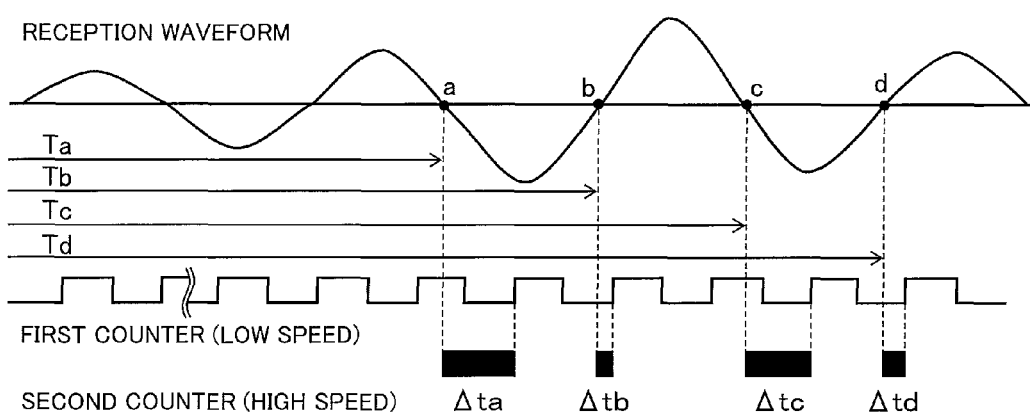
FIG. 3 is a time chart showing an example in which a plurality of zero cross points are set and propagation times corresponding to the zero cross points are measured in the flow meter device of FIG. 1.

Next, an operation of the flow meter device of the present embodiment will be described with reference to FIGS. 2 and 3. In FIGS. 2 and 3, regarding a transmission waveform and a reception waveform, a horizontal axis indicates a time and a vertical axis indicates a voltage.

For example, it is assumed that the first ultrasonic transmitter/receiver 11 is the transmission side, the second ultrasonic transmitter/receiver 12 is the reception side, the first ultrasonic transmitter/receiver 11 at the transmission side transmits the ultrasonic wave having a drive waveform of three pulses shown in FIG. 2, and the second ultrasonic transmitter/receiver 12 receives the reception waveform of FIG. 2. At this time, a starting point of the drive waveform is a starting point of the measurement of the propagation time and an end point of a third wave of the reception waveform corresponding to the drive waveform of the three pulses, i.e., a zero cross point is an end point of the measurement of the propagation time.

The first counter 161 which performs counting at a relatively low speed starts counting from the starting point and measures a time T1 that passes from the starting point until the first counter 161 counts up after the end point finishes. The second counter 162 which performs counting at a relatively high speed starts counting from the end point and measures a time Δt that passes from the end point until the first counter 161 counts up. The time measuring section 16 subtracts Δt from the time T1 to derive a reference propagation time T (T=T1−Δt), and subtracts a length Ta of the reception waveform of first to third waves corresponding to the drive waveform from the reference propagation time to derive a propagation time T0 of the ultrasonic wave (T0=T−Ta).

The flow calculating section 17 calculates the flow of the fluid such as the gas using the propagation time derived as described above. Specifically, in the example of FIG. 1, when a sound velocity is C, a flow velocity of the fluid is v, a distance between the ultrasonic transmitter/receiver 11 and the ultrasonic transmitter/receiver 12 is L, a propagation time in a case where the first ultrasonic transmitter/receiver 11 transmits the ultrasonic wave and the second ultrasonic transmitter/receiver 12 receives the ultrasonic wave is t1, and a propagation time in the reverse direction is t2, the propagation time t1 and the propagation time t2 can be found by the following formula 1 and formula 2, because an angle φ is formed between the direction in which the ultrasonic wave propagates (arrow S in FIG. 1) and the direction (arrow F in FIG. 1) in which the fluid flows.

$$t1 = L/(C + v \cos \phi) \qquad \text{(formula 1)}$$

$$t2 = L/(C - v \cos \phi) \qquad \text{(formula 2)}$$

From the following formula 3 derived from the formula (1) and the formula (2), the flow velocity v of the fluid can be derived. By multiplying the derived flow velocity v by a cross-sectional area of the measurement passage 20, a flow of the fluid can be derived.

$$v=L\cdot(1/t1-1/t2)/2\cos\phi \quad \text{(formula 3)}$$

In the present embodiment, as described above, the propagation time is measured using the first counter 161 and the second counter 162. Therefore, the first counter 161 is used for a most part of the time required for the measurement of the propagation time, while the second counter 162 is used only when accuracy is needed. In addition, the second counter 162 starts counting from the zero cross point of the reception waveform which is the end point. Therefore, the time when the second counter 162 starts counting can be optimized as compared to the art disclosed in Patent Literature 1. Therefore, lower electric consumption can be achieved, and the flow measurement can be performed with higher accuracy.

Since the second counter 162 stops counting just after the first counter 161 counts up after the end point, the first counter 161 and the second counter 162 are activated only for a short period which is close to a minimum period. Because of this, lower electric consumption can be achieved, and the flow measurement can be performed with higher accuracy, with higher levels.

As shown in FIG. 3, the time measuring section 16 is configured such that the second counter 162 is able to measure a plurality of propagation times on the basis of a plurality of zero cross points of the reception waveform rather than measurement of the propagation time only on the basis of the zero cross point at which the wave number of the reception waveform corresponding to the pulse number of the drive waveform ends. Thus, the flow calculating section 17 is able to calculate the flow using an average propagation time which is derived by averaging the plurality of propagation times obtained in the time measuring section 16. Therefore, measuring accuracy of the flow can be further improved.

The method of obtaining the plurality of propagation times is not particularly limited. As shown in FIG. 3, preferably, as the plurality of zero cross points, zero cross points where a sign changes from positive to negative are set equal in number to zero cross points where the sign changes from negative to positive. In the example shown in FIG. 3, a zero cross point "a" and a zero cross point "c" are zero cross points where the sign changes from positive to negative, while a zero cross point "b" and a zero cross point "d" are zero cross points where the sign changes from negative to positive.

In the illustrated example, the second counter 162 measures Δta and Δtc on the basis of the zero cross points where the sign changes from positive to negative, the first counter 161 measures time Ta and time Tc corresponding to Δta and Δtc, respectively, and two propagation times are obtained based on these. Also, the second counter 162 measures Δtb and Δtd on the basis of zero cross points where the sign changes from negative to positive, the first counter 161 measures time Tb and time Td corresponding to Δtb and Δtd, respectively, and two propagation times are obtained based on these. In this way, four propagation times in total are obtained. The flow calculating section 17 calculates the flow based on an average value of these four propagation times.

Since the zero cross points where the sign changes from positive to negative are set equal in number to the zero cross points where the sign changes from negative to positive in the case where the plurality of zero cross points are used, it becomes possible to implement highly accurate measurement which is not affected by a fluctuation in a zero cross reference electric potential. For example, in the illustrated example of FIG. 3, when the reference electric potential shifts upward, the time Ta and the time Tc decrease, whereas the time Tb and the time Td increase. Because of this, by obtaining the propagation time as the average time of these four times, a propagation time which is substantially equal to the propagation time in a case where the reference electric potential does not shift, can be obtained. Therefore, measurement accuracy can be further improved. The same occurs in a case where the reference electric potential shifts downward.

In the above configuration, preferably, a frequency of the count of the first counter 161 is set to a frequency which is equal to or greater than twice as high as a frequency of the ultrasonic wave transmitted from the ultrasonic transmitter/receiver 11, 12. If the frequency of the count of the first counter 161 is set to a frequency which is less than twice as high as the frequency of the ultrasonic wave, a pause period of the second counter 162 cannot be ensured. Therefore, by setting the frequency of the first counter 161 as described above, the first counter 161 and the second counter 162 can be activated efficiently, which can further improve measuring accuracy of the flow.

The present invention is not limited to the above described embodiment, and can be changed in various ways within a scope defined by the claims, and a different embodiment or an embodiment obtained by suitably combining technical means disclosed in plural modified examples is included in technical range of the present invention.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

Industrial Applicability

The present invention can be suitably widely used in fields of a flow meter device which utilizes an ultrasonic wave, such as a gas meter.

The invention claimed is:

1. A flow meter device comprising:
    first and second ultrasonic transmitters/receivers which are placed at an upstream side and a downstream side, respectively, in a measurement passage through which fluid flows;
    a transmission section that actuates the first ultrasonic transmitter/receiver to transmit a drive waveform;
    a reception section that detects the drive waveform propagated to the second ultrasonic transmitter/receiver, wherein the propagated drive waveform consists of a packet of waves having a plurality of zero-cross points;
    a time measuring section that comprises a first counter and a second counter counting at a higher speed than the first counter, wherein
    the first counter is activated to begin counting when the transmission section actuates the first ultrasonic transmitter/receiver, and the second counter is activated and deactivated to begin and end a counting operation repeatedly to perform multiple counting operations during a span of the wave packet such that in each of the counting operations the second counter is activated at a different one of at least some of the plurality of zero-cross points and deactivated at an end of a counting cycle of the first counter coming immediately subsequent to the corresponding one of the plurality of zero-cross points, and the time measuring section subtracts a time interval counted by the second counter during a respective at least some of the counting operations from a time interval counted by the first counter to an end of the corresponding one of the counting operations to obtain a plurality of propagation times for the propagated drive waveform; and a flow calculating section that calculates a flow rate of the fluid using an average of the plurality of propagation times obtained by the time measuring section.

2. The flow meter device according to claim 1, wherein the at least some of the plurality of zero-cross points consist of equal numbers of zero-cross points at which a sign changes from positive to negative and zero-cross points at which the sign changes from negative to positive.

3. The flow meter device according to claim 2, wherein the first counter counts at a frequency equal to or greater than twice as high as a frequency of the ultrasonic wave.

\* \* \* \* \*